Oct. 18, 1932.  I. A. WEAVER ET AL  1,883,156
AIRPLANE SERVICE DOLLY
Filed Oct. 2, 1929   4 Sheets-Sheet 1
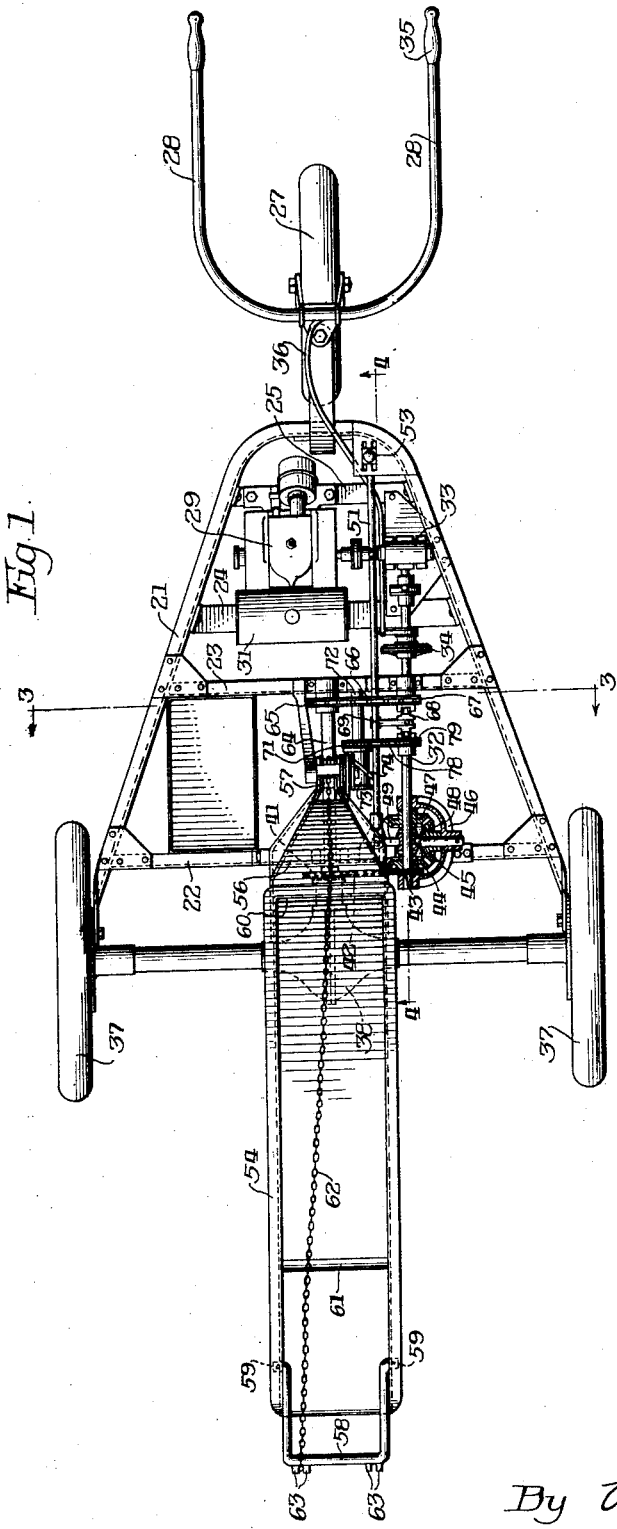
Inventors
Ira A. Weaver
William A. Ross
By Walter M. Fuller
Atty.

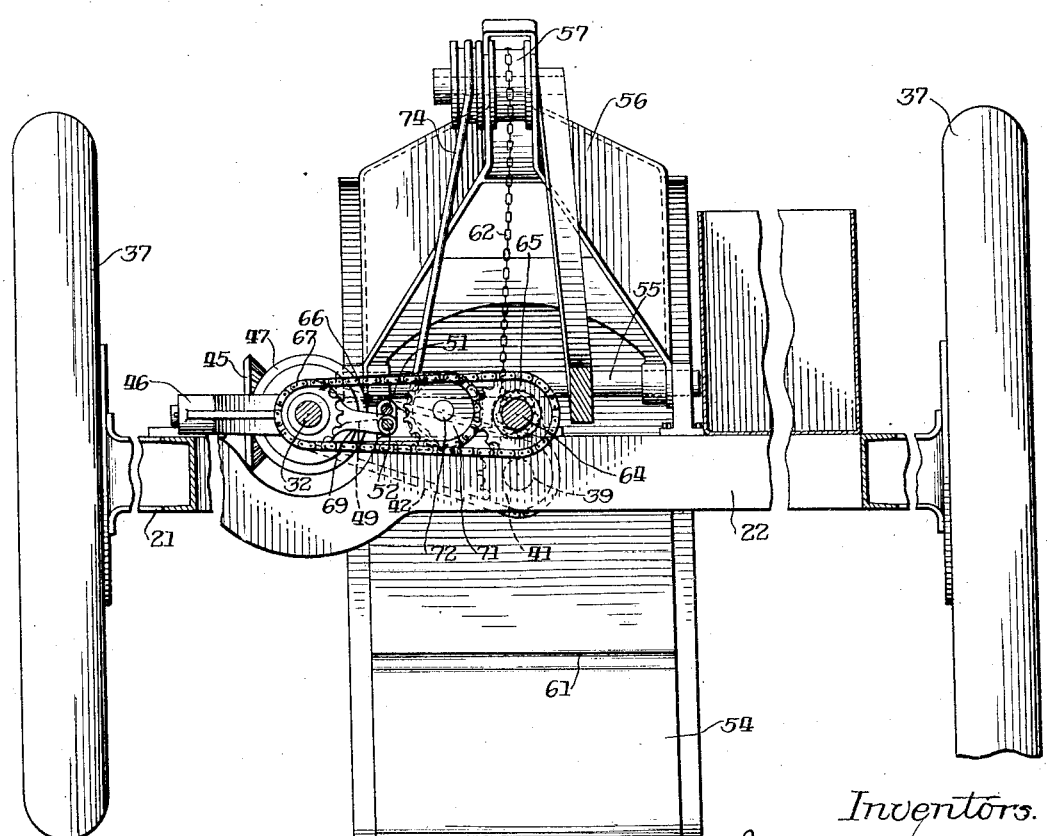

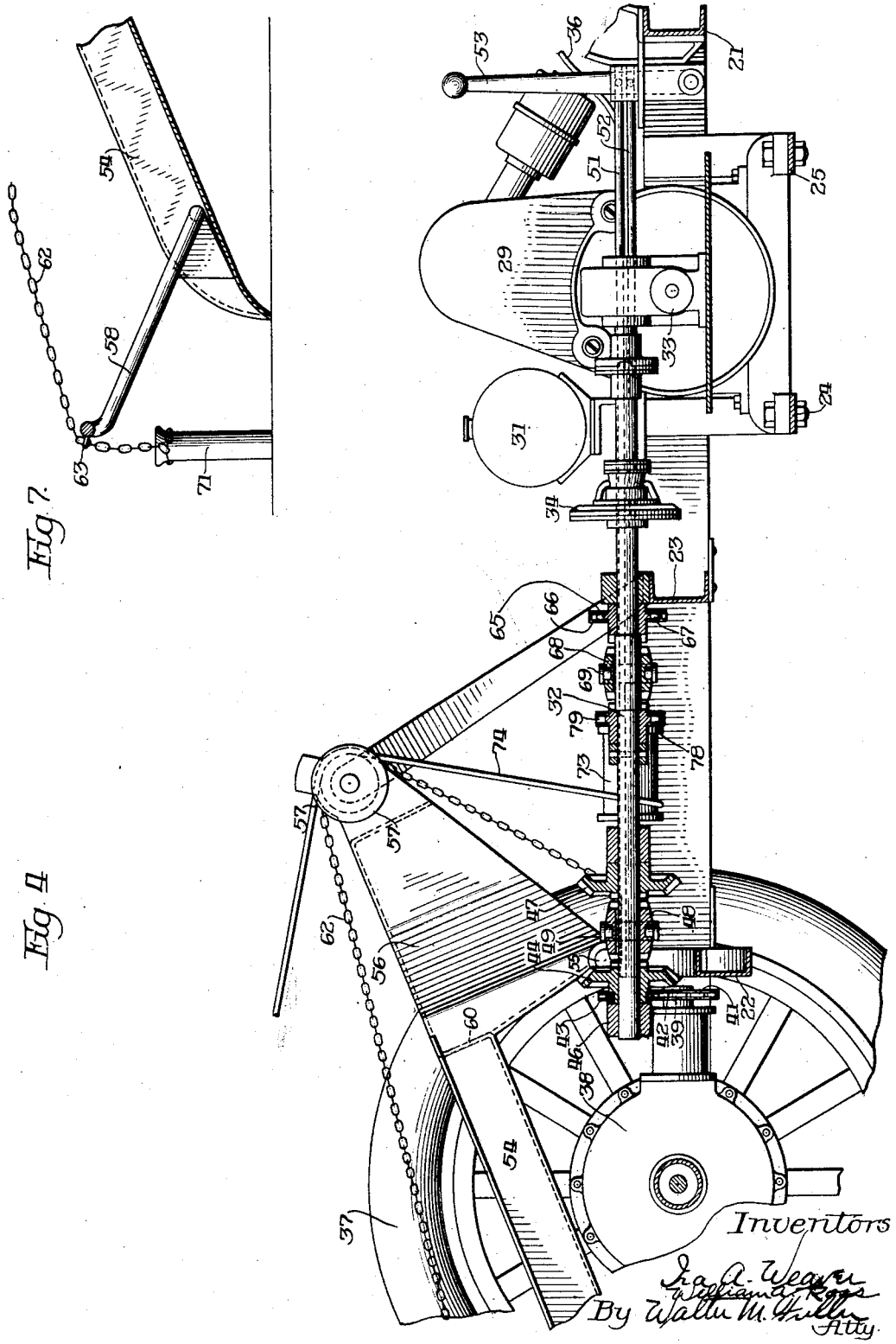

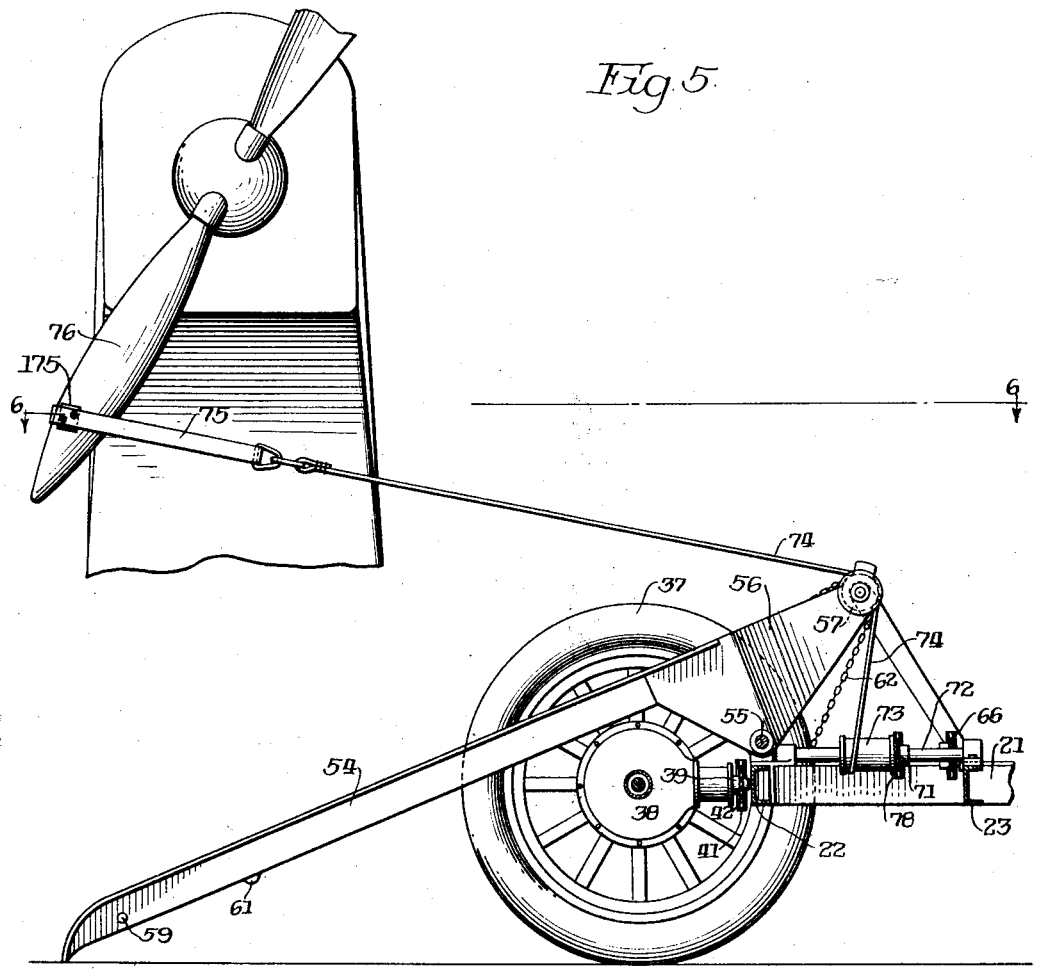
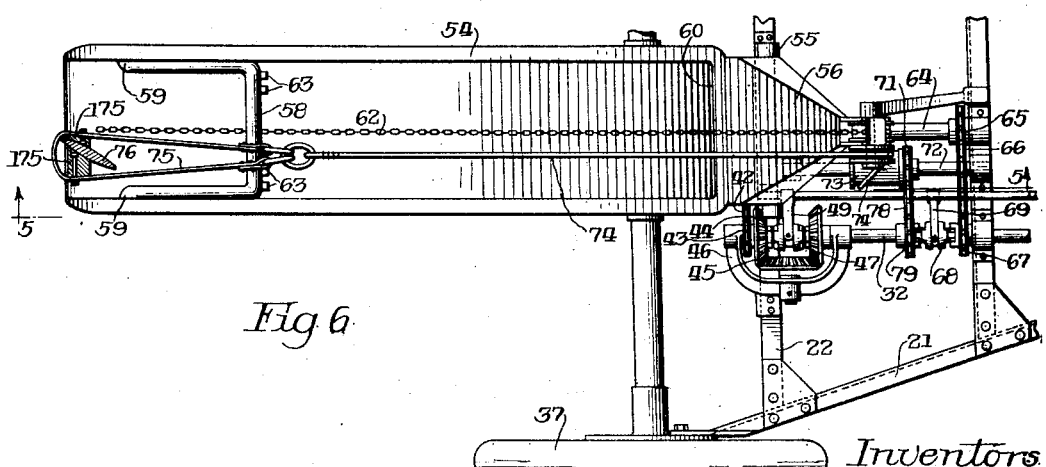

Patented Oct. 18, 1932

1,883,156

UNITED STATES PATENT OFFICE

IRA A. WEAVER AND WILLIAM A. ROSS, OF SPRINGFIELD, ILLINOIS, ASSIGNORS, BY MESNE ASSIGNMENTS, TO IRA A. WEAVER, OF SPRINGFIELD, ILLINOIS

AIRPLANE SERVICE DOLLY

Application filed October 2, 1929. Serial No. 396,618.

This invention pertains to appliances to facilitate the handling and servicing of airplanes and the cranking or starting of the engines thereof and it comprises a wheeled dolly constructed in a manner to adapt it to perform the special services specified.

One object of the invention is to supply a wheeled dolly of this character which has simple, effective and easily operated means for raising and supporting the tail of the airplane so that the latter may be readily rolled into or out of its hangar.

Another aim or purpose of the invention is to supply an appliance of this type equipped with means for temporary adaptation or application to the propeller of the airplane for the purpose of revolving it to start the engine, such attachment automatically freeing itself as soon as the propeller assumes revolution under the action of its engine.

The means which lifts and transports the tail end of the airplane is also adapted for the pulling of stakes out of the ground, such stakes being frequently employed at airports in association with protective tents.

To enable those acquainted with this industry and skilled in this art to fully comprehend the invention and its several structural and functional advantages, in the accompanying drawings, which form a part of this specification and to which reference should be had in connection with the following detailed description, a present, preferred embodiment of the invention has been depicted, and, for simplicity, like reference numerals have been employed to designate the same parts throughout the several views.

In these drawings:

Figure 1 is a plan view of such embodiment of the invention;

Figure 2 is a side elevation of the same on a smaller scale and it illustrates the manner of raising and transporting the tail of an airplane;

Figure 3 is a vertical cross-section through the appliance on an enlarged scale on line 3—3 of Figure 1;

Figure 4 is a fragmentary, longitudinal, vertical section on the same enlarged scale on line 4—4 of Figure 1;

Figure 5 is a fragmentary, longitudinal section showing the appliance ready to crank the airplane engine;

Figure 6 is a fragmentary plan view of the same general portion of the mechanism; and Figure 7 illustrates the manner in which the apparatus may be used for the up-pulling of stakes.

Referring to these drawings, it will be perceived that the improved and novel appliance includes a main-frame 21 of general triangular shape, having suitable cross-bars 22, 23, 24, 25 on which the various parts of the operating mechanism are carried, such frame being equipped at its rear end with an upwardly curved, supporting arm 26 mounted on a single, rubber-tired steering-wheel 27 operable by a pair of steering-bars 28, 28 actuated by an operator who walks at this end of the machine and governs its direction of travel by appropriate manipulation of the bars to turn the wheel, which, in a sense may be considered as a hand-controlled castor-wheel.

Such triangular frame is fitted with an internal-combustion engine 29, fed with fuel from an adequate supply-tank 31, and rotating an appropriately-journaled, longitudinally-disposed shaft 32 through a suitably-enclosed, worm-wheel construction 33 and a friction-clutch 34 under the oscillatory control of one of the grips 35 of the handle-bars 28 by means of a connection 36, common on motorcycles, operatively associated with the movable element of the clutch, so that the operator, by merely turning such grip, can render the clutch active or inactive as occasion demands.

The wide end of the triangular frame is carried on a pair of ground or drive wheels 37, 37 connected through an enclosed, differential mechanism 38 of the usual form to a short shaft 39 (Figure 4) supplied with a sprocket-wheel 41, the sprocket-chain 42 of which passes also around a sprocket-wheel 43 on the hub of a beveled gear 44 free to turn on the shaft 32, the teeth of such gear being in mesh with those of an intermediate, beveled gear 45 revoluble on a stud-shaft mounted in a yoke 46 having ends through which the shaft 32 extends, such middle gear 42 being also in mesh with another beveled gear 47.

The inner face of the companion, oppositely-disposed gears 44 and 47 are formed with clutch teeth or shoulders, and a clutch-sleeve 48, slidable on and splined to the shaft 32, is located between the two gears and it has clutch lugs or teeth at its opposite ends for selective, cooperative engagement with those of either one of the two gears.

Such rotary clutch-sleeve is connected in the usual manner through a yoke or fork 49 to the upper one 51 of two shift-rods 51 and 52 associated with an upstanding control-handle 53 which may be tilted to one side and rocked backwardly and forwardly to actuate the one shaft or rod 51 or inclined in the opposite direction and similarly shifted to operate the companion rod 52, in much the same manner that gears are shifted by a similar handle in the transmission of an ordinary automobile.

From the foregoing, it will be clear, that, when the handle 53 is in its neutral, upright position, neither of the gears 44 or 47 is operative, because both are unclutched from the shaft 32, but, if the handle 53 be manipulated in the specified manner, either of these gears may be clutched to the shaft and thus cause the appliance, through the mechanism described, to travel forwardly or rearwardly by reason of the driving action of the ground-wheels 37, 37, the steering of the apparatus being effected through the handle-bars 28, 28.

An inclined, trough-like or channel member 54 is hinged near its upper end on the frame at 55 by means of side bracket-plates 56 fastened to the element 54, the top end of such structure, as will be seen, having a revoluble drum or sheave 57, the channel portion of the chute also having an upper end wall 60.

The lower end of such hinged, channel member is designed to rest on the ground, and it is fitted with a hinged bail 58 which, when in lowered position, extends on the ground well beyond the end of the chute-like member on which it is rockingly mounted at 59, the middle cross-bar of the bail when swung over into the trough of the member 54 falling into a crosswise cavity or groove 61 of its floor so that it will be below the surface thereof and out of the way.

The machine is supplied with a chain 62, for a purpose hereinafter indicated, which extends up the chute and over the bail being accommodated between either of two pairs of spaced lugs 63, 63 outstanding from the bail cross-bar.

Such chain extends around the drum or sheave 57, its end being connected to, and the chain being designed to be wound upon and paid out from, a suitably-journaled, central, longitudinally-disposed shaft 64 supplied with a sprocket-wheel 65, a sprocket-chain 66 cooperating therewith and with a sprocket-wheel 67, the hub of which is free to turn on shaft 32 and which has clutch projections or teeth on one end to coact with those of a clutch-sleeve 68 keyed to and slidable on the shaft 32, the fork or yoke 69 of such clutch-sleeve being connected to the lower shaft 52 hereinbefore referred to and denoted as operable by the handle 53.

Thus such handle 53, by proper manipulation, can render the clutch between the parts 67 and 68 operative or inoperative to wind up the chain on the shaft 64 or to permit its paying-out therefrom.

This portion of the apparatus operates practically as follows, assuming that the chute member has its lower end resting on the ground with its bail 58 lying on the ground beyond it, the chain 62 overlying the bail between one pair of its lugs 63 and with its end attached to the skid of the airplane tail, as depicted in full lines in Figure 2.

In some cases, the dolly may be arranged lengthwise of the airplane, or crosswise the same as shown in full lines in Figure 2, depending upon the possibility or lack of possible interference of the dolly with some part of the plane.

Then when the handle 53 is manipulated to clutch sprocket-wheel 67 to shaft 32, shaft 64 will turn to wind up the chain thereon in the nature of a drum.

Owing to the initial, upward swinging of the bail 58, as required by the cooperation of the chain links with the lugs 63, the airplane tail skid is lifted preliminarily more or less directly upwardly, thus readily freeing it from the ground if it has previously sunk somewhat therein, as frequently happens.

The further winding of the chain elevates the tail skid further and the turning of the bail carries it up on to and deposits it on the chute member 54 between its upstanding, marginal flanges, so that there is no danger of the skid sliding off.

When the bail has turned as much as it is permitted to do, its cross-bar falls into the channel 61, and continued winding up of the chain slides the airplane tail skid up the chute until it strikes or engages the end wall 60, whereupon, continued shortening of the chain automatically rocks the chute 54 up into substantially horizontal position as shown in dotted lines in Figure 2, and then the dolly can push the airplane into proper position in the hangar without difficulty, the tail of the airplane, of course, being supported by the dolly during this operation, as shown.

The airplane having been properly housed in its hangar, the dolly is disconnected and backed away permitting the tail skid to slide down the chute on to the floor which thereafter supports it.

A stake 71 driven into the ground may be pulled out therefrom by the same mechanism of the dolly and in substantially the same way that the airplane tail skid was first raised, as indicated above.

The means for cranking or starting the airplane engine will now be described.

A short shaft 72 is rotatably mounted on the frame of the dolly parallel to the chain winding shaft 64, and it is supplied with a winding-drum 73 which cooperates with a cable 74 extending around the sheave 57 and provided with a loop 75 at its end adapted to extend around one of the blades 76 of the airplane propeller, such loop internally having one or more rubber or other resilient pads 175 bearing directly on the propeller blade.

Shaft 72 is fitted with a sprocket-wheel 77, its sprocket-chain 78 cooperating with another sprocket-wheel 79 revoluble on shaft 32 and whose hub is provided with clutch teeth to coact with similar teeth on one end of clutch-sleeve 68.

When handle 53 is shifted to clutch sprocket-wheel 79 to shaft 32, then shaft 72 and its winding drum 73 will be revolved by the engine 29 to initiate or start the revolution of the propeller, and, as soon as this is effected, the loop 75 will drop off of the propeller blade so that the propeller may thereafter be rotated by its own engine.

The strap or loop around the blade and its rubber pads are arranged in such a way that, when the pull is applied, the pads will squeeze the propeller and will for a time retain hold thereon after the direction of pull has changed from a right angle to the propeller.

This invention is defined in the appended claims, but it is to be remembered that it is capable of many embodiments differing more or less in structural details but all incorporating the underlying principles involved.

We claim:—

1. In an airplane service dolly, the combination of a wheeled carriage, means permitting steering of said carriage, an internal-combustion engine on said carriage, an inclined support hinged on said carriage and having an abutment near its upper end, and means operated by said engine designed to engage and to advance the tail skid of an airplane up such support and to rock the latter on its hinge by the engagement of said skid with said abutment.

2. In an airplane service dolly, the combination of a wheeled carriage, means permitting steering of said carriage, an internal-combustion engine on said carriage, an inclined support hinged on said carriage and having an abutment and sheave near its upper end, and means including a chain passing over said sheave operated by said engine and designed to engage and to advance the tail skid of an airplane up such support and to rock the latter on its hinge by the engagement of said skid with said abutment.

3. In an airplane service dolly, the combination of a wheeled carriage, an inclined support on said carriage, means designed to cooperate with the tail skid of an airplane and to slide it up said support, and a bail hinged on said support and cooperating with said sliding means to cause an initial nearly vertical lift of said skid preliminary to its sliding travel up said support.

4. In an airplane service dolly, the combination of a wheeled carriage, means permitting steering of said carriage, an internal-combustion engine on said carriage, an inclined support hinged on said carriage and having an abutment near its upper end, a sheave on said support near its upper end, a bail hinged on said support near its lower end in a position to permit it to extend beyond the lower end of said support, said support having a cross channel adapted to receive the cross-bar of said bail when the latter is swung over onto the support, a chain adapted to be fastened to the tail skid of an airplane and passing over said sheave, means forming a detachable connection between said chain and bail cross-bar, and means operated by said engine to wind up and pay out said chain whereby said skid is first lifted nearly vertically by the rocking action of said bail on said chain and then deposited on and slid up said support until it engages said abutment, whereupon further winding up of the chain swings said support up off of the ground.

5. In an airplane service dolly, the combination of a wheeled carriage, means permitting steering of said carriage, power means on said carriage, an inclined support hinged on said carriage and having an abutment near its upper end, and means operated by said power means designed to engage and to advance the tail skid of an airplane up such support and to rock the latter on its hinge by the engagement of said skid with said abutment.

In witness whereof we have hereunto set our hands.

IRA A. WEAVER.
WILLIAM A. ROSS.